US011258266B2

(12) United States Patent
Shariatzadeh et al.

(10) Patent No.: US 11,258,266 B2
(45) Date of Patent: Feb. 22, 2022

(54) ADAPTIVE VOLTAGE CONTROL OF DISTRIBUTED ENERGY RESOURCES

(71) Applicant: Doosan GridTech, Inc., Seattle, WA (US)

(72) Inventors: Farshid Shariatzadeh, Seattle, WA (US); Troy Nergaard, Mercer Island, WA (US); David Kaplan, Bainbridge Island, WA (US)

(73) Assignee: Doosan GridTech, Inc., Seattle, WA (US)

( * ) Notice: Subject to any disclaimer, the term of this patent is extended or adjusted under 35 U.S.C. 154(b) by 812 days.

(21) Appl. No.: 15/987,797

(22) Filed: May 23, 2018

(65) Prior Publication Data

US 2019/0363543 A1 Nov. 28, 2019

(51) Int. Cl.
| | | |
|---|---|---|
| H02J 3/44 | (2006.01) | |
| H02J 3/16 | (2006.01) | |
| H02J 3/46 | (2006.01) | |
| H02J 3/18 | (2006.01) | |
| H02J 3/38 | (2006.01) | |

(52) U.S. Cl.
CPC .................. *H02J 3/44* (2013.01); *H02J 3/16* (2013.01); *H02J 3/1892* (2013.01); *H02J 3/383* (2013.01); *H02J 3/386* (2013.01); *H02J 3/46* (2013.01)

(58) Field of Classification Search
CPC .... H02J 3/44; H02J 3/16; H02J 3/1892; H02J 3/383; H02J 3/386; H02J 3/46
USPC ....................................................... 307/75
See application file for complete search history.

(56) References Cited

U.S. PATENT DOCUMENTS

| | | | | |
|---|---|---|---|---|
| 8,965,591 B2* | 2/2015 | San Andres | .......... | H02J 3/0073 |
| | | | | 700/291 |
| 9,325,174 B2* | 4/2016 | Tyler | .......... | H02J 3/38 |
| 2004/0051387 A1 | 3/2004 | Lasseter et al. | | |

(Continued)

FOREIGN PATENT DOCUMENTS

KR  10-1043572  6/2011

OTHER PUBLICATIONS

International Search Report and Written Opinion received for counterpart International Application No. PCT/US2019/033469; dated Aug. 30, 2019, 9 pages.

*Primary Examiner* — Alfonso Perez Borroto
(74) *Attorney, Agent, or Firm* — Shook, Hardy & Bacon LLP

(57) ABSTRACT

The disclosed system provides an adaptive control system technique generally related to distributed energy resources (DERs) located in distribution circuits. More specifically, the system technique relates to a DER with both active and reactive generation capability. In an embodiment, the system measures a voltage phase angle and a current phase angle of distribution feeder circuit, and measures a voltage value output by a power converter. The system calculates an active power setpoint value and a reactive power setpoint value of the power converter based on the measured voltage value, and the measured voltage phase angle and current phase angle. The system then sets the active and reactive power setpoint values on the power converter. The disclosed system automatically adjusts the setpoints to real-time load characteristics of the distribution feeder circuit, increases distribution feeder hosting capacity, and enables DERs to integrate in distribution feeders more efficiently.

43 Claims, 9 Drawing Sheets

(56) References Cited

U.S. PATENT DOCUMENTS

2007/0135970 A1    6/2007  Zhou et al.
2008/0315685 A1  12/2008  Mandalakas et al.
2015/0311716 A1* 10/2015  He ............................ H02J 3/16
                                                                700/287
2017/0256944 A1*  9/2017  Hui .......................... H02J 3/241

* cited by examiner (b) Voltage and Current Phasors at time $t+T$ (a) Voltage and Current Phasors at time $t$

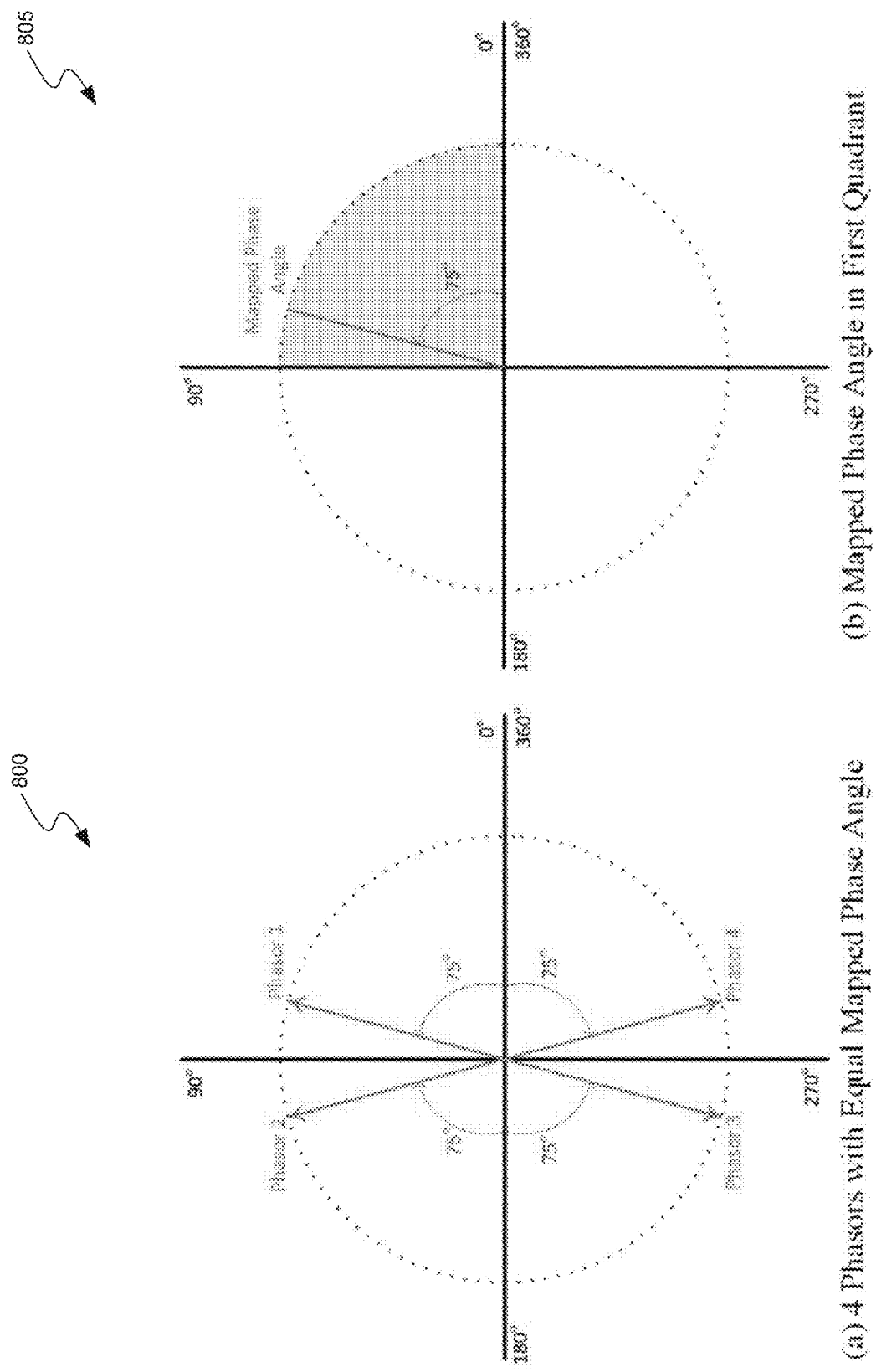

ADAPTIVE VOLTAGE CONTROL OF DISTRIBUTED ENERGY RESOURCES

BACKGROUND

The electric power system is transforming to a resource mix that relies less on fossil fuel energy sources while integrating more wind, solar, distributed generation, and demand response resources. Additionally, Distributed Energy Resources (DER) are a rapidly growing part of this transformation. A DER refers to any energy source that is located on a distribution feeder (i.e., a circuit conductor that leaves an electric substation) and supplies electricity. Integration of renewable resources such as wind and solar in distribution feeders presents challenges due to the characteristics of these intermittent resources and limited hosting capacity of distribution feeders. Hosting capacity is defined as the total renewable energy capacity that can be accommodated on a given feeder without adversely impacting voltage, protection, and power quality without feeder upgrades or modifications. One of the major impacts of DERs is in quality of service caused by voltage fluctuations. For example, the output of photovoltaic (PV) systems is expected to be high at midday off-peak hours, which may lead to an increase in voltage to an unacceptably high level.

Another characteristic of distribution feeders is the very large value of the R/X ratio of the distribution feeder cables compared to transmission line cables. R/X ratio refers to the ratio of resistance to reactance in the impedance of the distribution or transmission lines. Traditionally, energy resources were located at transmission systems and typical voltage control strategies were based on the low R/X ratio of the transmission lines on which the energy resources were located. Low R/X ratio leads to low sensitivity of voltage to active power. Therefore, in traditional voltage control methods, reactive power is used to control voltage output at the energy source terminal.

BRIEF DESCRIPTION OF THE DRAWINGS

FIG. 8A is a diagram illustrating a second example having four phasors with equal mapped phase angle in accordance with embodiments herein.

FIG. 8B is a diagram illustrating the second example having four phasors with mapped phase angle in first quadrant in accordance with embodiments herein.

DETAILED DESCRIPTION

Figure 1:
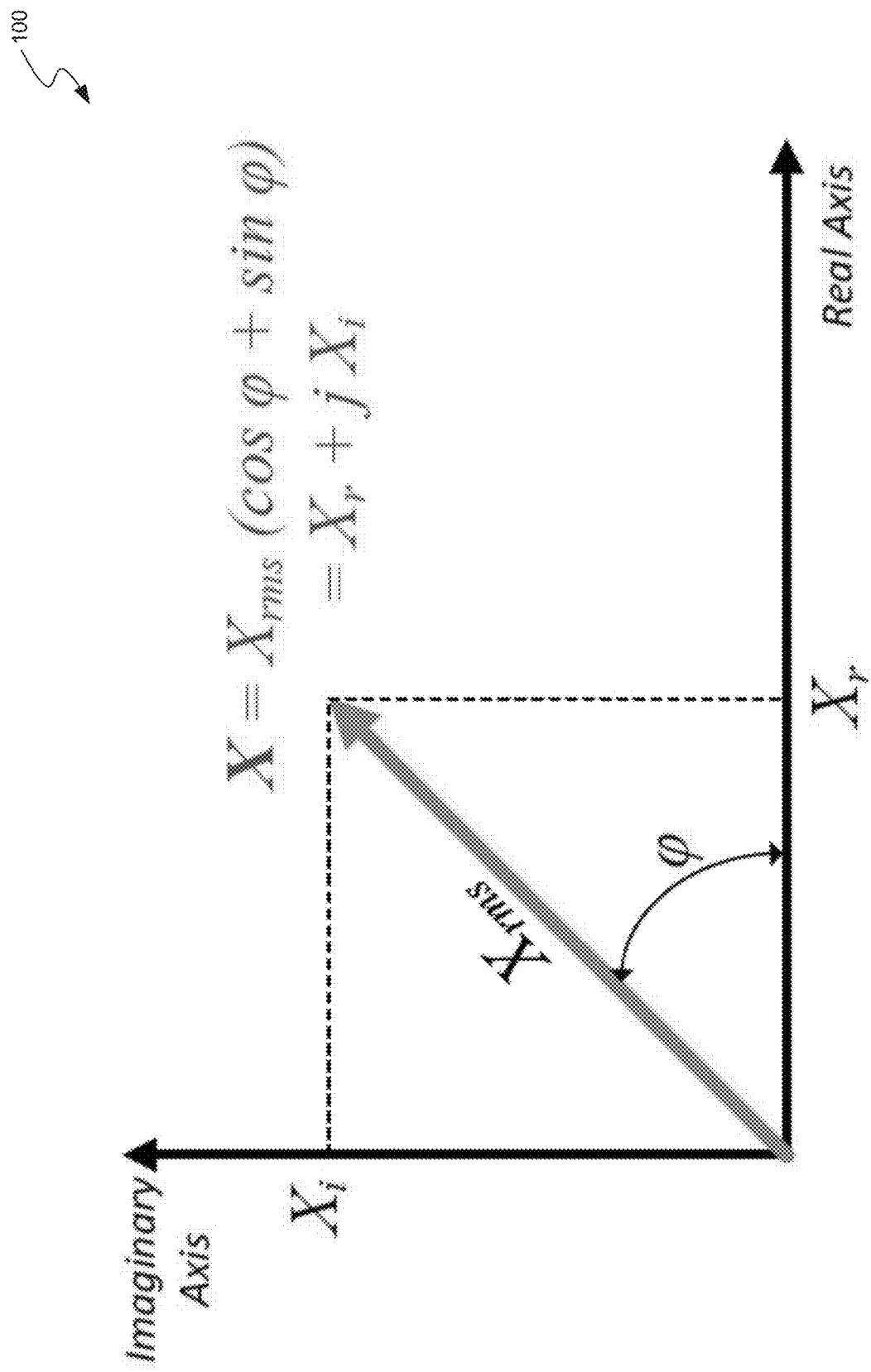
FIG. 1 is a graph illustrating the relationship between polar and rectangular representations in a complex plane in accordance with embodiments disclosed herein.

The disclosed system provides an adaptive control system technique generally related to distributed energy resources (DERs) located in distribution circuits. In distribution systems, the large R/X ratio of distribution lines makes voltage less sensitive to reactive power injection and more sensitive to active power injection, as compared to transmission systems. In addition, the R/X ratio of distribution feeders varies during the day due to load behavior. Traditional voltage control strategies based on reactive power injection alone simply fail to adequately address variations in load behavior on distribution feeders. These and other problems exist in traditional voltage control methods.

The disclosed voltage control system technique relates to a DER with both active and reactive generation capability. In an embodiment, the system measures a voltage phase angle and a current phase angle of distribution feeder circuit, and measures voltage at the output of a power converter. The system calculates an active power setpoint value and a reactive power setpoint value of the power converter based on the measured voltage value, and the measured voltage and current phase angles. The system then sets the active and reactive power setpoint values on the power converter. The disclosed system automatically adjusts the setpoints to real-time load characteristics of the distribution feeder circuit, increases distribution feeder hosting capacity, and enables DERs to integrate in distribution feeders more efficiently.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

As used herein, synchrophasors are measurements made by metering devices such as phasor measurement units (PMUs) that measure alternating current (AC) electrical flows using a common time source (such as a Global Positioning System (GPS)) for synchronization. Time synchronization allows synchronized real-time measurements of multiple remote measurement points on an electrical power grid. PMUs measure electrical waves in the form of a phasor, and when a phasor measurement is time-stamped, it is referred to as a synchrophasor. The term synchrophasor is sometimes used synonymously to refer to a PMU. Additional details regarding synchrophasors are contained in Institute of Electrical and Electronics Engineers (IEEE) standard C37.118-2011, which is herein incorporated by reference in its entirety.

Phasor representation of sinusoidal signals (voltage, current, etc.) may be used in AC power system analysis. A sinusoidal waveform is defined in Equation 1:

$$x(t)=X_m \cos(\omega t+\varphi) \qquad (1)$$

In Equation 1, x(t) is sinusoidal waveform at time t, $X_m$ is the maximum magnitude of the sinusoidal waveform, ω is angular frequency in radians per second (rad/sec) described in Equation 2 below, and φ is the phase angle in radians (rad).

$$\omega = 2\pi f \quad (2)$$

In Equation 2, f is frequency in hertz (Hz). Equation 3 is commonly represented as a phasor:

$$X = (X_m/\sqrt{2})e^{j\varphi} \quad (3)$$
$$= (X_m/\sqrt{2})(\cos\varphi + j\sin\varphi)$$
$$= X_r + jX_i$$

In Equation 3, the magnitude of the phasor X is the root mean-square (RMS) value $(X_m/\sqrt{2}) = X_{rms}$ of the waveform. RMS is a mathematical quantity used to compare both alternating and direct values for both voltage and current. The RMS value of AC current is the direct current (DC) value of current which when passed through a resistor for a given period of time would produce the same heat as that produced by AC current when passed through the same resistor for the same time. The subscripts "r" and "i" indicate real and imaginary rectangular components of the phasor in the complex plane, respectively. FIG. 1 is a graph 100 illustrating the relationship between polar and rectangular representations in a complex plane in accordance with embodiments herein.

Figure 2:
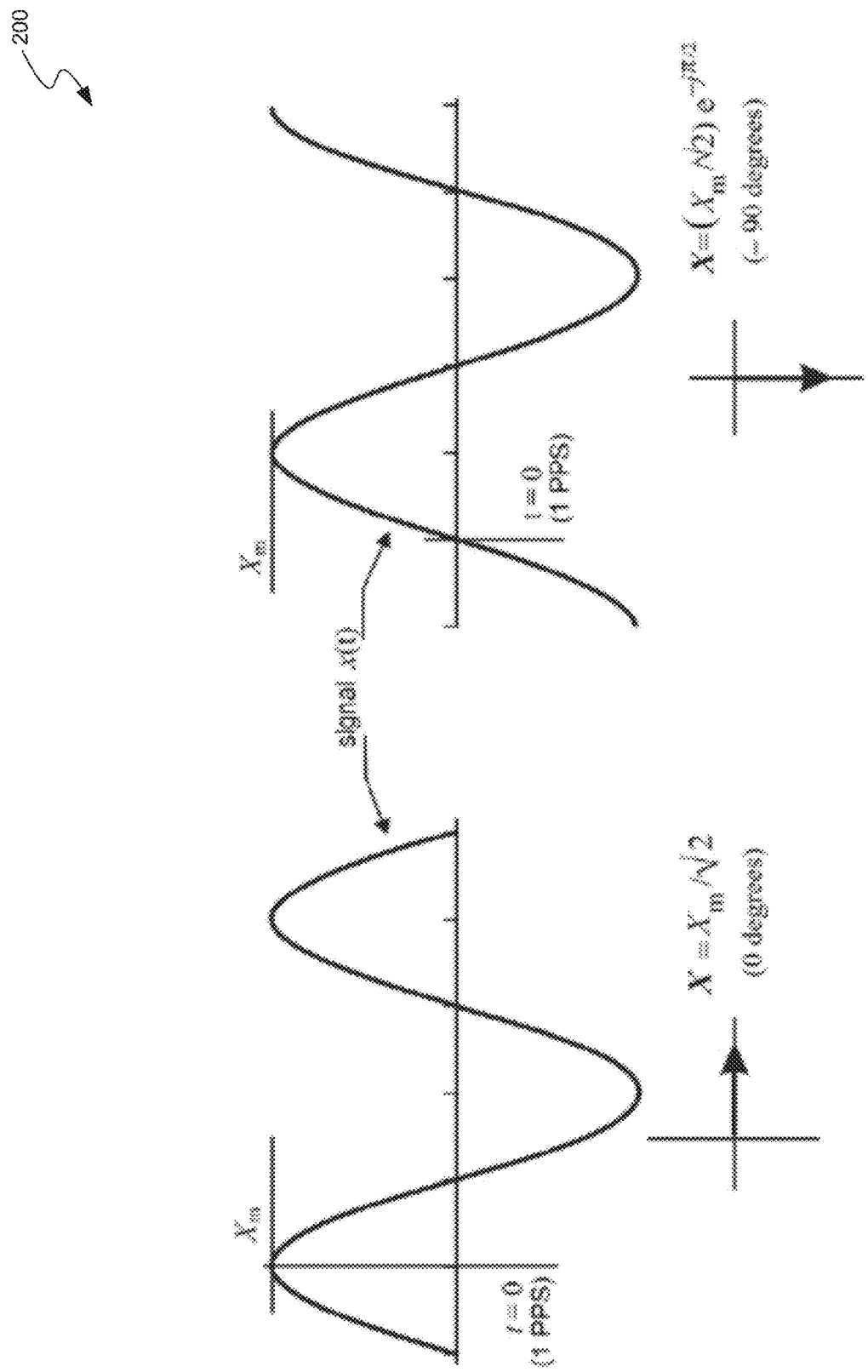
FIG. 2 is a graph illustrating the phase angle and Coordinated Universal Time (UTC) time relationship in accordance with embodiments herein.

The synchrophasor (also called a "synchronized phasor") of the signal x(t) in Equation 1 is the phasor X in Equation 3 where φ is the instantaneous phase angle relative to a reference cosine function at the nominal system frequency synchronized to coordinated universal time (UTC). Under this definition, φ is the offset from a cosine function at the nominal system frequency synchronized to UTC. A cosine has a maximum at t=0, so the synchrophasor angle is 0 degrees when the maximum of x(t) occurs at the UTC second rollover (1 pulse-per-second (PPS) time signal), and −90 degrees when the positive zero crossing occurs at the UTC second rollover (sine waveform). PPS is an electrical signal that has a width of less than one second and a sharply rising or abruptly falling edge that accurately repeats once per second. FIG. 2 is a graph 200 illustrating the phase angle and UTC time relationship in accordance with embodiments herein.

In practical power system situations, the magnitude ($X_m$), frequency (f), and phase angle (φ) are functions of time. In the case where the amplitude is a function of time $X_m(t)$ and the sinusoid frequency is also a function of time f(t), then g=f−$f_0$, where $f_0$ is the nominal frequency and g is the difference between the actual and nominal frequencies. In this instance, g will also be a function of time (e.g., g(t)=f(t)−$f_0$). For the special case where $X_m(t)=X_m$ is constant and g=Δf is a constant offset from the nominal frequency, the synchrophasor is as shown in Equation 4:

$$X_t = (X_m/\sqrt{2})e^{j(2\pi\Delta ft+\varphi)} \quad (4)$$

Figure 3:
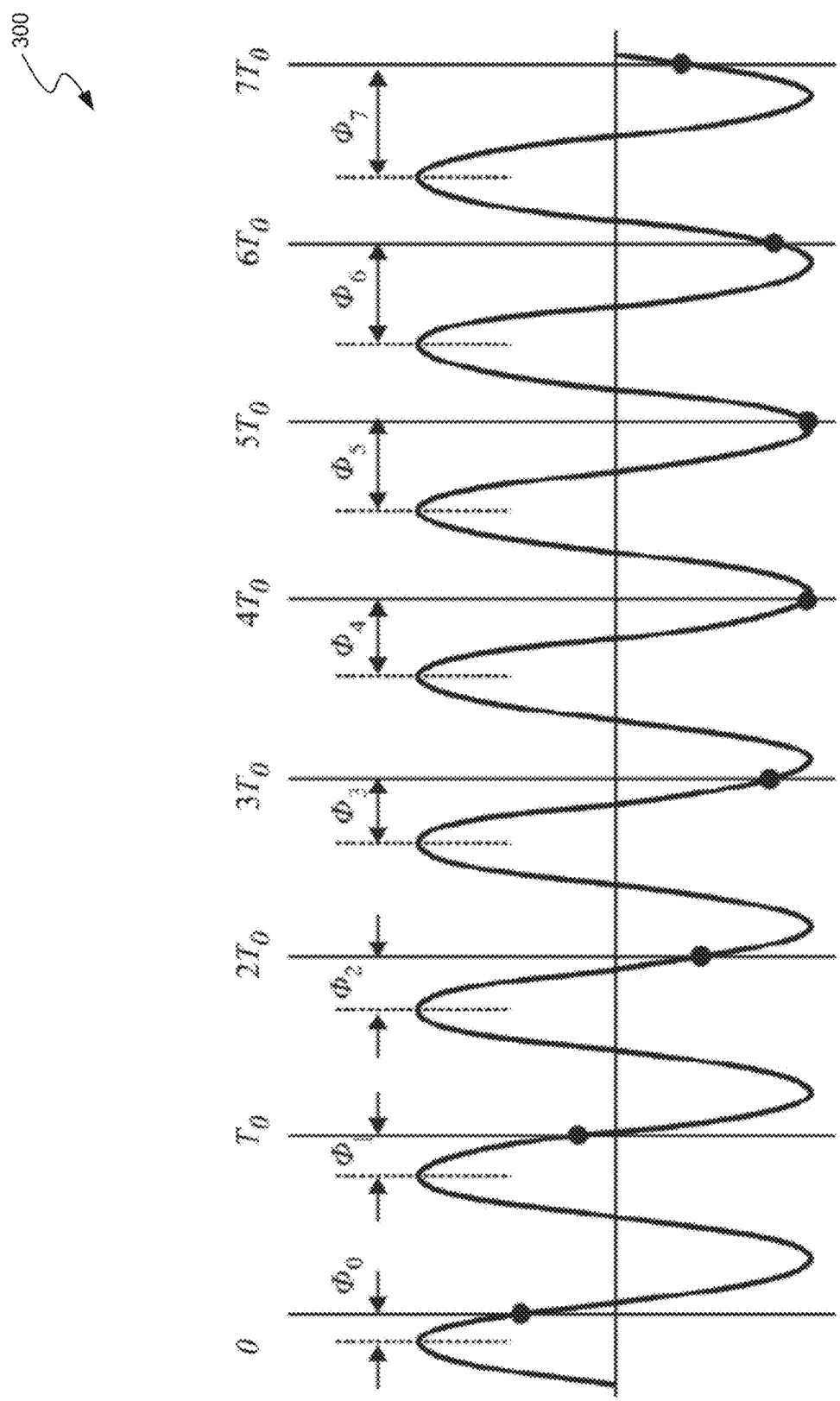
FIG. 3 is a graph illustrating a sinusoid with frequency f>$f_0$ in accordance with embodiments disclosed herein.
Figure 4:
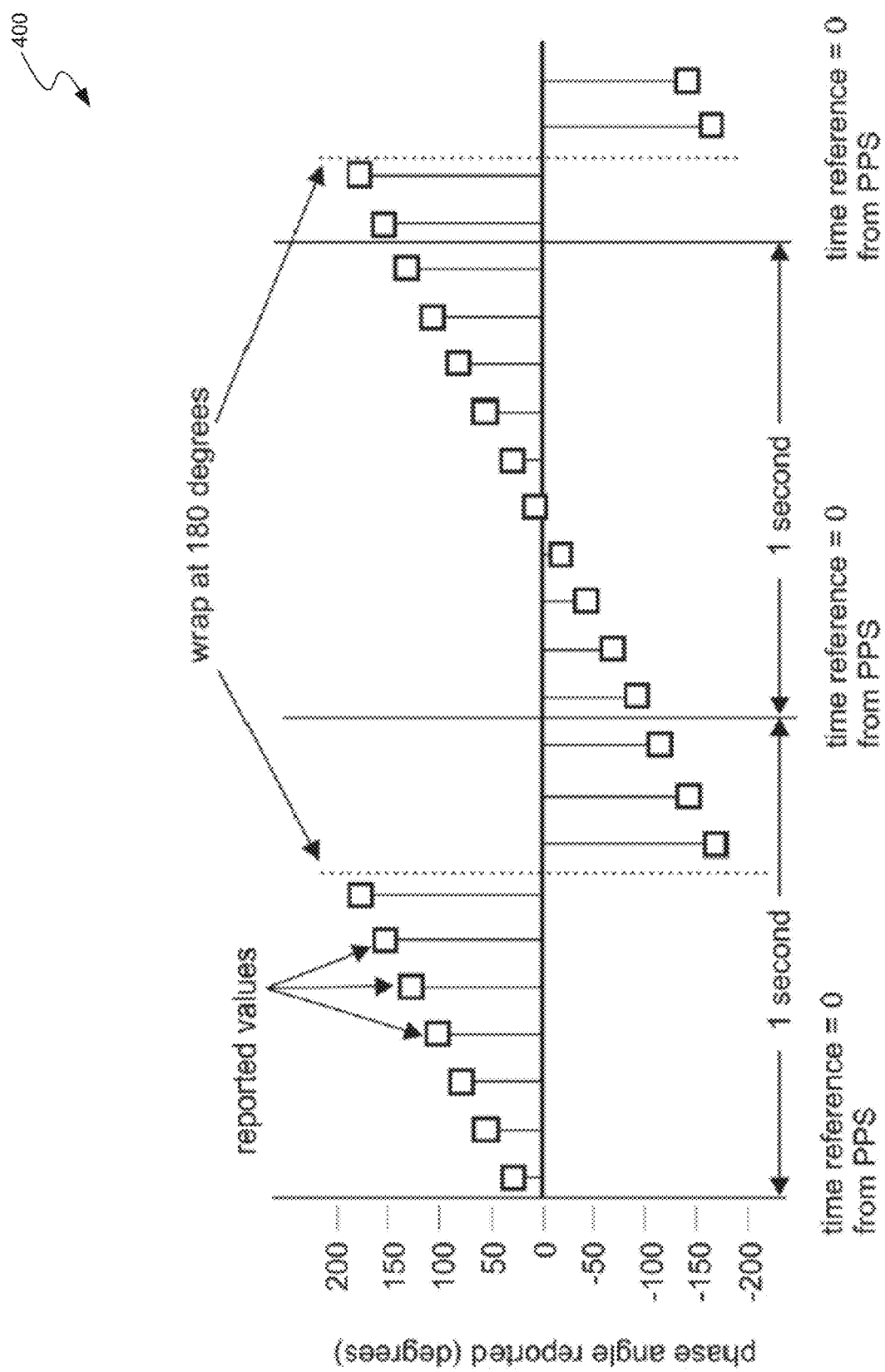
FIG. 4 is a graph illustrating the sampling of a power frequency sinusoid at off-nominal frequency in accordance with embodiments herein.

Equation 4 results in rotation at the uniform rate Δf, which is the difference between the actual and nominal frequency. FIG. 3 is a graph 300 illustrating a sinusoid with frequency f>$f_0$ in accordance with embodiments disclosed herein. Regarding FIG. 3, consider that a sinusoid off-nominal system frequency is observed at intervals {$T_0$, $2T_0$, $3T_0$, ..., $nT_0$}, where $T_0=1/f_0$ (the nominal power system period) and the corresponding phasor representations are {$X_0$, $X_1$, $X_2$, ..., $X_n$, ...}. If the sinusoid frequency f≠$f_0$ and f<$2f_0$, the observed phasor will have a constant magnitude, but the phase angles of the sequence of phasors {$X_0$, $X_1$, $X_2$, ..., $X_n$, ...)} will change uniformly at a rate $2\pi(f-f_0)T_0$, as illustrated in FIG. 3. If these values were reported over time, they would continuously increase until they reached 180 degrees where they would wrap around to −180 degrees and continue to increase as shown in FIG. 4 (synchrophasors are commonly reported in angles −180 degrees to +180 degrees rather than 0 to 360 degrees), which is a graph 400 illustrating the sampling of a power frequency sinusoid at off-nominal frequency in accordance with embodiments herein.

Distribution feeder-line flows are typically two or three orders of magnitude smaller than transmission flows, and branch line flows are smaller still. Distribution phasors typically have angle differences too small and rapidly-changing to resolve with traditional transmission-type PMUs. Dramatic increases in distributed (and variable) solar PV present challenges to the successful future operation of the distribution grid. These challenges may be addressed by high-precision synchrophasors delivered by micro phasor measurement units (μPMU) that are designed specifically for distribution-level applications.

Phasor tracking may be used in local control system techniques based on μPMU measurements; however, it requires the controllable DER asset to be installed far enough from the first measurement point (e.g. distribution feeder head substation) in order to influence the power flow. If two measurement points are too close to each other with no load or generation between them, then phase angle measurements may be too similar. The voltage control system technique disclosed herein may be implemented on a variety of controllers, such as the DOOSAN GRIDTECH INTELLIGENT CONTROLLER (DG-IC) manufactured by Doosan GridTech Inc., and may be operated on a variety of feeders such as those manufactured by Austin Energy (AE) Kingsbury and Mueller. In selected feeders, assets are energy storage systems (ESS) which are located at or near the substation.

Figure 5:
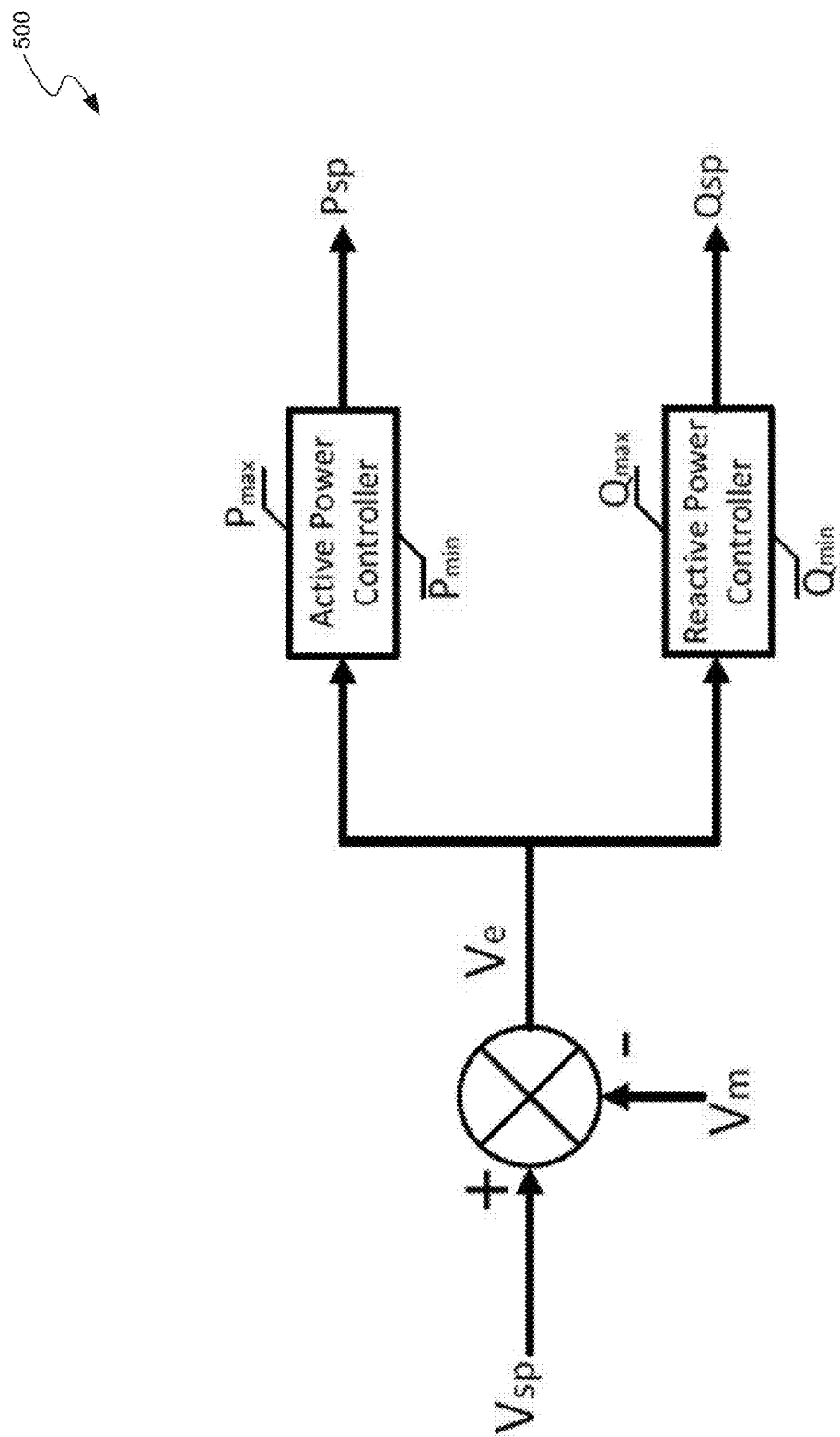
FIG. 5 is a block diagram representation of a system technique to control voltage magnitude at a node based on local voltage magnitude and phase angle measurements in accordance with embodiments herein.

FIG. 5 is a block diagram representation 500 of a system technique to control voltage magnitude at a node based on local voltage magnitude and phase angle measurements in accordance with embodiments herein. Representation 500 shows a proposed framework of the control system technique. $V_{sp}$, $V_m$, and $V_e$ are voltage magnitude setpoint, measured voltage magnitude, and voltage error, respectively. Separate controllers for active power (P) and reactive power (Q) of the DER asset can be a proportional, PI, or PID controller with limiter. $P_{max}$ and $P_{min}$ are maximum and minimum active power capacity of the controlled DER asset, and $Q_{max}$ and $Q_{min}$ are maximum and minimum reactive power capacity of the controlled DER asset and may or may not be static values. Equations 5 and 6 (defined below) show relationship between input ($V_e$) and output ($P_{sp}$ and $Q_{sp}$) of a general PI controller without limiter, assuming input is constant for sample period T. Equation 5 is defined as:

$$P_{sp} = K_p^P V_e + K_i^P \Sigma V_e T \quad (5)$$

Equation 6 is defined as:

$$Q_{sp} = K_p^Q V_e + K_i^Q \Sigma V_e T \quad (6)$$

In Equations 5 and 6, $K_p^P$ and $K_i^P$ are proportional and integral gain of active power controller, and $K_p^Q$ and $K_i^Q$ are proportional and integral gain of reactive power controller.

As described herein, the disclosed voltage controller uses phase angle measurements to determine appropriate values for controller gains. If the ratio of X/R in the system is large, then system is more inductive. Therefore, sensitivity of voltage magnitude is higher to reactive power and sensitivity of phase angle is higher to active power. The same is true when applied in transmission systems to decouple active and reactive power control. However, because the ratio of X/R in distribution systems is not large enough (i.e. distribution systems have more resistive load) it is not possible to decouple active power with phase angle and reactive power with voltage magnitude. This fact is shown by linear approximation. In fact, in resistive circuits, active power is more effective to control voltage magnitude. Phase angle measurement by a μPMU can be used to determine controller gains (i.e. effectiveness of active power and reactive power on the voltage magnitude).

Equation 7 shows the relationship between voltage and current phase angles at a node and equivalent impedance of the circuit from that node:

$\varphi = \delta_V - \delta_I$ $\tan \varphi = X/R$ $\cos \varphi = \text{Power Factor}$ (7)

In Equation 7, $\varphi$ is phase angle between voltage and current, $\delta_V$ is voltage phase angle and $\delta_I$ is current phase angle. $\delta_V$ and $\delta_I$ are measured by a μPMU. A higher $\varphi$ value indicates a more inductive circuit, which leads to higher reactive power controller gains. A lower $\varphi$ value indicates a more resistive circuit, which leads to higher active power controller gains. In some embodiments, a look up table may be used to keep possible values for active power controller gain and reactive power controller gain and apply them based on the measured $\varphi$ value in the previous time step. In other embodiments, the disclosed system finds a relationship between $\varphi$ and the active power controller gain and reactive power controller gain.

While the μPMU is capable of relatively high sample rates, for example 512 samples per cycle (approximately 30 kHz), for power quality measurements (e.g. harmonic content), the disclosed system is capable of measuring the magnitude and phase angle of the fundamental, which is particularly meaningful over time periods of at least one cycle. In synchrophasor mode, the voltage and current magnitude and phase angle data are communicated by the μPMU twice per cycle (e.g., 120 times per second in an embodiment). However, for voltage control applications, present utility efforts consider time scales on the order of tens of seconds or minutes. The disclosed system is capable of a sampling rate for voltage control application greater than one second and up to ten seconds or more.

Again referencing FIG. 5, the below equations 8 and 9 show relationship between input (i.e. $V_e$) and output (i.e. $P_{sp}$ and $Q_{sp}$) of a general PI controller, assuming input is constant for sample period (T):

Equation 8: $P_{sp} = P_{max}$ if $\beta_P(K_p^P V_e + K_i^P \Sigma V_e T) > P_{max}$ $P_{sp} = \beta_P(K_p^P V_e + K_i^P \Sigma V_e T)$ $P_{sp} = P_{min}$ if $\beta_P(K_p^P V_e + K_i^P \Sigma V_e T) < P_{min}$ (8)

Equation 9: $Q_{sp} = Q_{max}$ if $\beta_Q(K_p^Q V_e + K_i^Q \Sigma V_e T) > Q_{max}$ $Q_{sp} = \beta_Q(K_p^Q V_e + K_i^Q \Sigma V_e T)$ $Q_{sp} = Q_{min}$ if $\beta_Q(K_p^Q V_e + K_i^Q \Sigma V_e T) < Q_{min}$ (9)

In Equations 8 and 9, $K_p^P$ and $K_i^P$ are proportional and integral gain of active power controller, and $K_p^Q$ and $K_i^Q$ are proportional and integral gain of reactive power controller. These gains are used to tune PI controller, and phase angle measurement is used to find weighting coefficients ($\beta_P$ and $\beta_Q$) for active and reactive power control loops. In some embodiments, active power setpoint $P_{sp}$ varies proportionally with derivative gain of active power controller, and reactive power setpoint $Q_{sp}$ varies proportionally with derivative gain of reactive power controller.

The weighting coefficient may be calculated in four steps. The first step in calculating the weighting coefficient is finding phase angle difference between voltage and current for all phases reported by μPMU according to Equation 10:

$\varphi_i = \delta_{Vi} - \delta_{Ii}, i \in \{a,b,c\}$ (10)

In Equation 10, $\varphi$ is phase angle difference between voltage and current of phase i, $\delta_{Vi}$ is measure voltage phase angle of phase i, and $\delta_{Ii}$ is measured current phase angle of phase i by μPMU, both in radians. The phase angle differences capture the feeder characteristics by a tangent function ($\tan \varphi = X/R$). However, μPMU reports the phase angle values between 0 and $2\pi$. Therefore, using a tangent function may lead to unstable control loops.

Figure 6B:
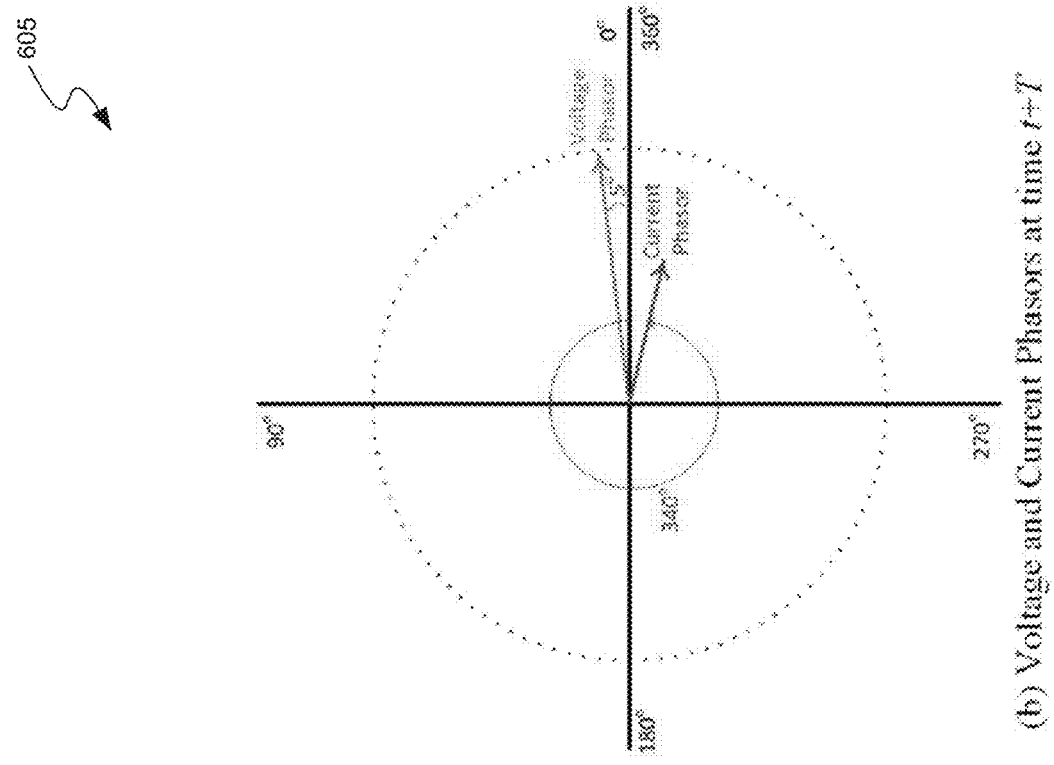
FIGS. 6A-6B show hypothetical voltage and current phasors at two different sample times in accordance with embodiments herein.
Figure 6A:
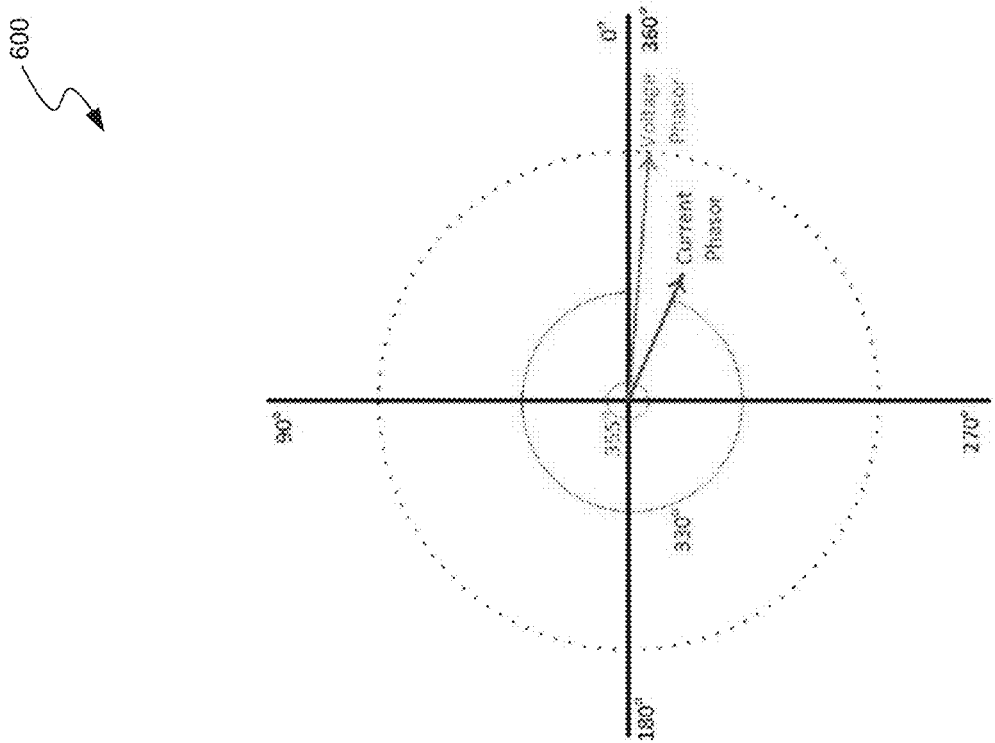

The second step in calculating the weighting coefficient is designed to avoid unstable control behavior. To avoid the unstable control behavior, closeness of phase angle difference to zero and 90 degrees is considered a stable measure. FIGS. 6A-6B show hypothetical reported voltage and current phasors 600 and 605 measured by μPMU at two different sample times in accordance with embodiments herein. Note that calculated voltage and current phase angle by μPMU increase over time, which causes the voltage and current phasors to rotate. FIGS. 6A-6B illustrate that when one of the phasors passes 360 degrees (or $2\pi$ radians), phase angle difference increases. In particular, phase angle difference as defined is 150 at time t (see FIG. 6A) and changes to −335° at time t+T (see FIG. 6B). To avoid this problem, phase angle difference in first quadrant ($\gamma$) is calculated using Equation 11:

$\gamma_i = 1.57((\text{floor}((\varphi_i/1.57)\%2+2)\%2) - ((\varphi i \%1.57+1.57)\%1.57)(-1)^{(\text{floor}((\varphi i/1.57)\%2+2)\%2)}) + 1 i \in \{a,b,c\}$ (11)

In Equation 11, $\gamma_i$ is phase angle difference in first quadrant of phase i, $\varphi_i$ is phase angle difference between voltage and current of phase i, 1.57 is $\pi/2$ (or 90°), floor( . . . ) indicates floor operator that returns the largest integer less than or equal to specified number, and % indicates the remainder operator that computes the remainder after dividing the numerator by the denominator.

Figures 7A, 7B:
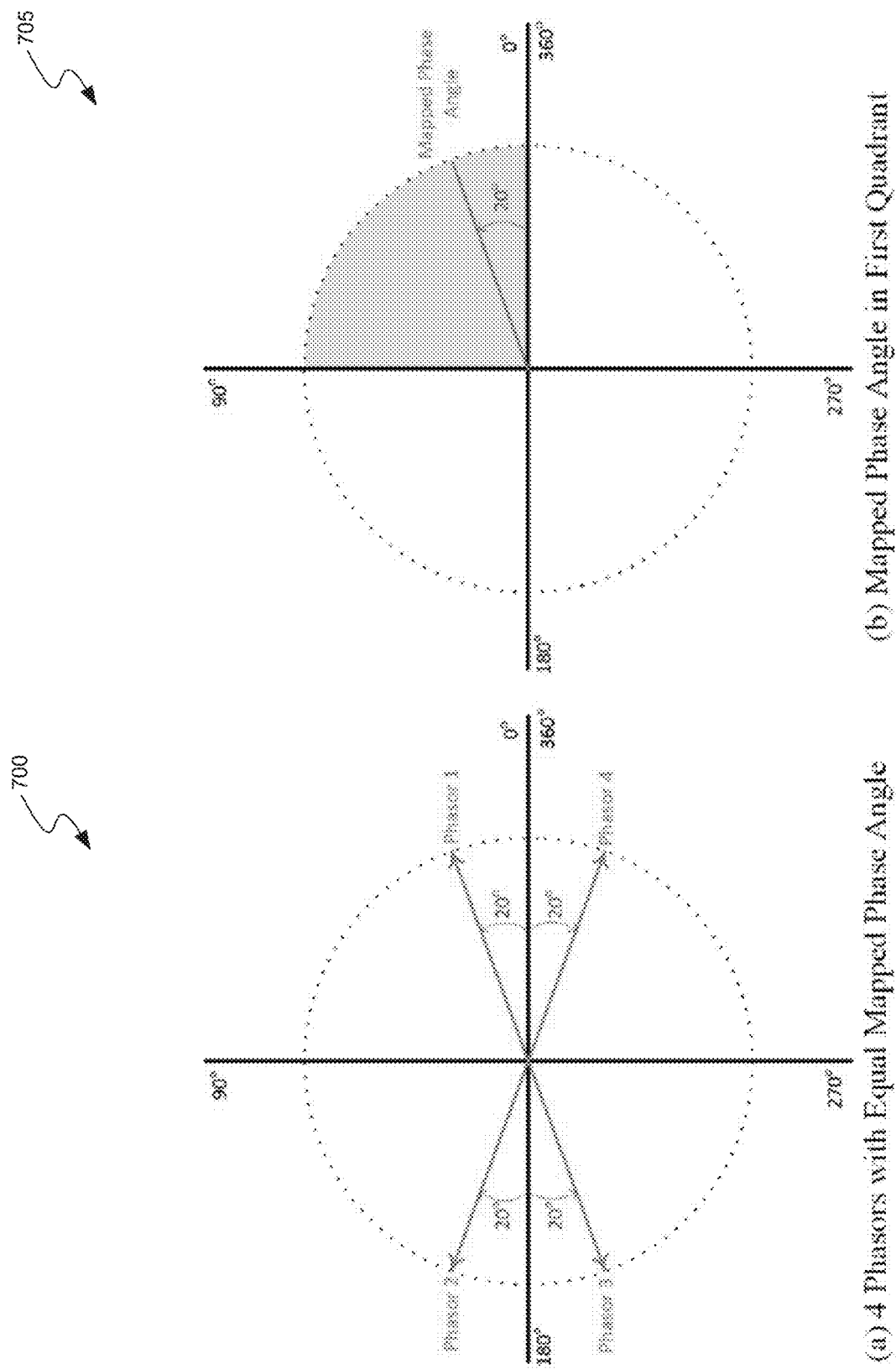
FIG. 7A is a diagram illustrating a first example having four phasors with equal mapped phase angle in accordance with embodiments herein.
FIG. 7B is a diagram illustrating the first example having four phasors with mapped phase angle in first quadrant in accordance with embodiments herein.

Equation 11 maps a phasor to first quadrant while keeping its distance from the X-axis and Y-axis the same. FIGS. 7A-7B and 8A-8B each show examples of mapped phase angle into first quadrant. In particular, FIG. 7A is a diagram 700 illustrating a first example having four phasors with equal mapped phase angle, and FIG. 7B is a diagram 705 illustrating the first example having four phasors with mapped phase angle in first quadrant. FIG. 8A is a diagram 800 illustrating a second example having four phasors with equal mapped phase angle, and FIG. 8B is a diagram 805 illustrating the second example having four phasors with mapped phase angle in first quadrant. Note that each of the four phasors in FIG. 7A will be mapped to the same phase angle in FIG. 7B. Likewise, each of the four phasors in each FIG. 8A will be mapped to the same phase angle in FIG. 8B. If phase angle difference between voltage and current on the feeder is relatively stable, phase angle difference in first quadrant will have same behavior. On the other hand, any sudden change in the calculated phase angle in first quadrant may be due to a sudden change of feeder characteristics and may require appropriate control action.

The third step in calculating the weighting coefficient is designed to address a two-phase or three-phase system. To deal with a two-phase or three-phase system, Average Phase Angle Difference in First Quadrant is calculated using Equation 12:

$$\bar{\gamma} = (\Sigma_{i=1}^{N} \gamma_i)/N \quad (12)$$

In Equation 12, $\bar{\gamma}$ is average phase angle difference in first quadrant, $\gamma_i$ is phase angle difference in first quadrant of phase i, and N is total number of phases (e.g. for three phase measurement N=3).

Finally, the fourth step in calculating the weighting coefficient is calculating active and reactive power control loop weighting coefficients using Equation 13:

$$\beta_Q = (\bar{\gamma}/1.57)\alpha$$

$$\beta_P = 1 - \beta_Q \quad (13)$$

In Equation 13, $\beta_Q$ is reactive power weighting coefficient, $\beta_P$ is active power weighting coefficient, $\bar{\gamma}$ is average phase angle difference in first quadrant, and $\alpha$ is the cutoff point. More reactive power is expected to be used when $\bar{\gamma}$ is closer to $\pi/2$ (or 90°). The cutoff point can be used to manipulate the amount of active and reactive power while voltage is under control.

Figure 9:
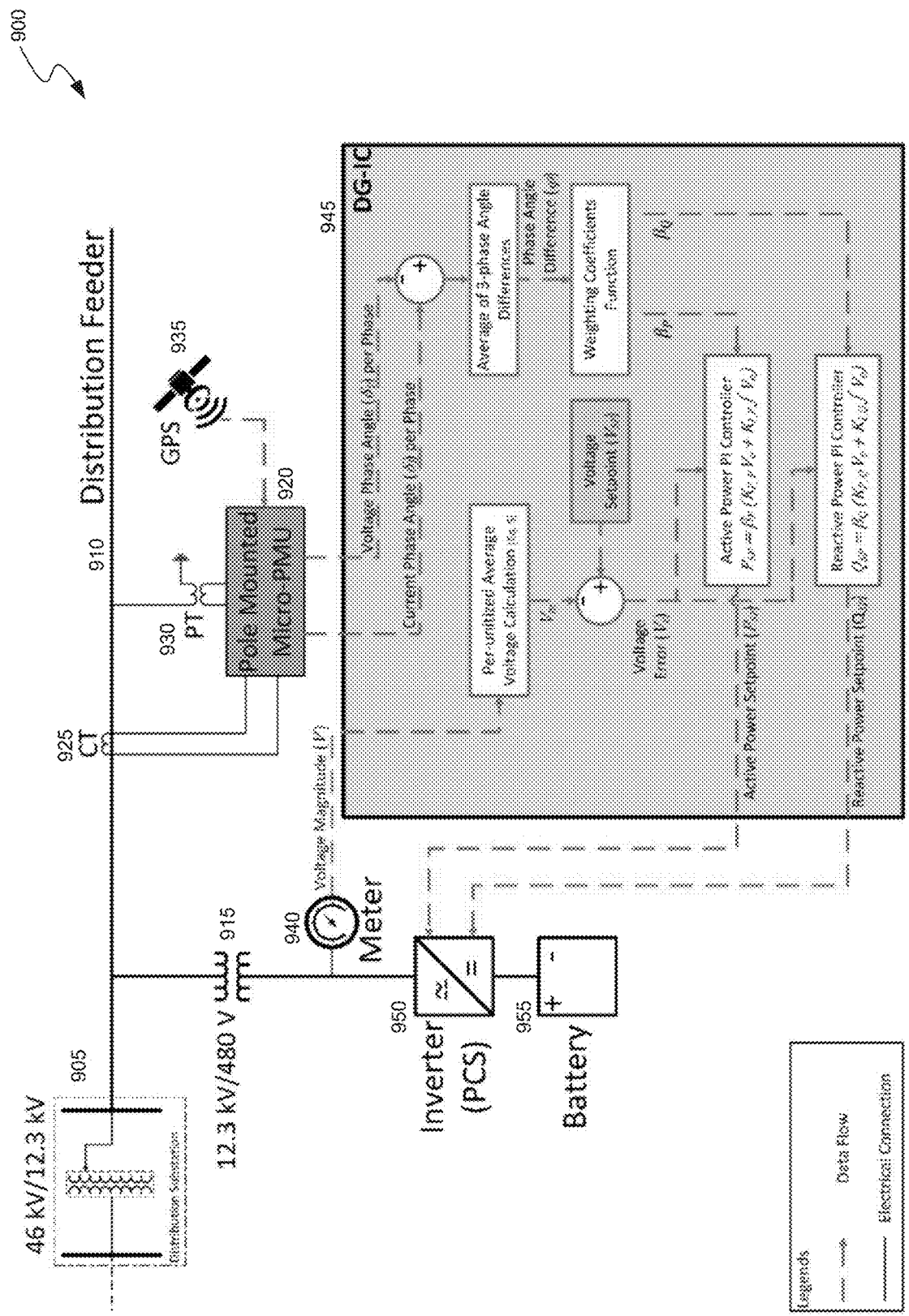
FIG. 9 is a detailed block diagram illustrating an environment in which a voltage control system technique may operate in accordance with embodiments herein.

FIG. 9 is a detailed block diagram illustrating an environment 900 in which a voltage control system technique may operate in accordance with embodiments herein. Although not required, aspects and implementations of the system may be embodied in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Environment 900 includes distribution substation 905, which transforms electricity of high voltage from one or more long-range transmission lines (such as 46 kV) to a lower voltage (such as 12.3 kV) that is more appropriate for transmitting electricity directly to consumers via distribution feeder 910. Distribution feeder 910 includes a current transformer (CT) 925 and potential transformer (PT) 930, which are coupled to μPMU 920. In some embodiments, μPMU 920 may be pole mounted. As described herein, μPMUs are micro phasor measurement units that measure AC electrical flows using a common time source for synchronization and are designed specifically for use on distribution-level applications. Environment 900 includes global positioning system (GPS) unit 935 that is coupled to μPMU 920 such that GPS 935 may time stamp phasor values measured by μPMU 920. Environment 900 also includes transformer 915, inverter/power conversion system (PCS) 950, and battery 955. PCS 950 is capable of converting electric power supplied from battery 955 and supplying the converted power to a load on distribution feeder 910. In some embodiments, PCS 950 converts power from direct current (DC) power to alternating current (AC) power. In some embodiments, PCS 950 may comprise an induction motor as part of a generator. PCS 950 uses an active power setpoint and a reactive power setpoint to regulate the degree to which battery 955 is used as a resource in the disclosed system. Voltage controller 945 is a controller that outputs the active power setpoint and reactive power setpoint to PCS 950. Voltage controller 945 takes as inputs a voltage phase angle $\delta_V$ and current phase angle $\delta_I$ from μPMU 920, and a voltage magnitude V from meter 940. Although meter 940 is shown, in some embodiments voltage controller 945 may take as an input a voltage magnitude V from an inverter or other device that has voltage telemetry. As previously described, voltage controller 945 uses the voltage phase angle $\delta_V$ and current phase angle $\delta_I$ to calculate a phase angle difference $\varphi$, which is then used to generate weighting coefficients that are used in the calculation for the active power and reactive power setpoints.

In some embodiments, the voltage control system technique may be able to use a synchronized pair of voltage and current angle measurements for calculation purposes, a user may be able to enable or disable the voltage control system technique at any time, the user may be able to start/stop control at any time, the user may be able to set maximum and minimum limits for active and reactive power setpoints, the user may be able to set control rate, and/or the user may be able to log data and set a rate at which data is logged. In some embodiments, μPMU real-time current and voltage measurements per phase may be used to calculate phase angle difference, and voltage magnitude measurement at ESS terminal may be used to find voltage error (note that a dedicated meter or measured voltage by inverter may be used).

The disclosed system may incorporate a user interface (UI) on a computing system to enable a user to configure and operate aspects of the disclosed voltage control system technique, such as defining the rate of control to run the voltage control system technique, defining the base value for the meter on the ESS terminal, defining the value for a cut-off point, defining the PI control loop coefficients for active power and reactive power, and defining the voltage setpoint for ESS.

The disclosed system provides multiple parameters for a user to configure operation of the adaptive voltage controller. A "signal meter" parameter allows a user to specify a meter whose voltage readings are used by PI controller so that the adaptive voltage mode controls voltage at the specified meter location. A "Micro-PMU meter" parameter allows a user to specify Micro-PMU device whose readings are used to adjust PI controller coefficients. Phase angle measurements from this meter will be used determine X/R ratio on the line. A "cutoff point" parameter allows a user to specify a value indicating contribution of active and reactive power of DER to control voltage by Adaptive Voltage Mode. If this value is too small, the voltage control system technique assumes X/R is too large for a small difference in voltage and current phase angle and it will lead to use much more reactive power than active power to control voltage. If this value is too large, the voltage control system technique assumes X/R is too small for a large difference in voltage and current phase angle and it will lead to use much more active power than reactive power to control voltage.

An "Active Power Proportional Gain" parameter allows a user to set a multiplier which specifies how aggressively Adaptive Voltage Mode initially attempts to achieve a new voltage target by exploiting active power of the DER. If this multiplier is too low, it will take too long for voltage to meet its target. If this multiplier is too high, it may overshoot the target beyond tolerances and cause volatile oscillation. An "Active Power Integral Gain" parameter allows a user to set a multiplier which specifies how aggressively Adaptive Voltage Mode attempts to react to error in voltage by exploiting active power of the DER. If this multiplier is too low, it will take too long for voltage to meet its target. If this multiplier is too high, it may overshoot the target beyond tolerances and cause volatile oscillation. A "Reactive Power Proportional Gain" parameter allows a user to set a multiplier which specifies how aggressively Adaptive Voltage Mode initially attempts to achieve a new voltage target by exploiting reactive power of the DER. If this multiplier is too low, it will take too long for voltage to meet its target. If this multiplier is too high, it may overshoot the target beyond tolerances and cause volatile oscillation.

A "Reactive Power Integral Gain" parameter allows a user to set a multiplier which specifies how aggressively Adaptive Voltage Mode attempts to react to error in voltage by exploiting reactive power of the DER. If this multiplier is too low, it will take too long for voltage to meet its target. If this multiplier is too high, it may overshoot the target beyond tolerances and cause volatile oscillation. A "voltage setpoint" parameter allows a user to specify the value of voltage setpoint in per-unit. If this value is too large, the DER may not be able to achieve the value and may result in constant operation of the DER at full capacity. A "Base Voltage Value" parameter allows a user to specify the base value for voltage for a signal meter in Volts. If this value is not correct, it may lead to constant error in controller calculation and PI controller may be saturated. This may in turn lead to constant operation of DER at full capacity.

Remarks

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A voltage control system comprising:
    a distributed energy resource;
    a phasor measurement unit that measures a voltage phase angle and a current phase angle of an electric power line connected to a load;
    a power converter that (a) converts electric power supplied from the distributed energy resource and (b) supplies the converted power to the load;
    a voltage meter that measures a voltage value output by the power converter; and
    a controller that sets an active power setpoint value and a reactive power setpoint value of the power converter based on the voltage value measured by the voltage meter, the voltage phase angle of the electric power line connected to the load, and the current phase angle of the electric power line connected to the load.

2. The system of claim 1, wherein the power converter converts electric power from direct current (DC) power to alternating current (AC) power.

3. The system of claim 1, wherein the phasor measurement unit is adapted to receive a signal from a Global Positioning System (GPS) for associating a time stamp with the measured voltage phase angle and the measured current phase angle.

4. The system of claim 1, wherein the electric power line is a distribution feeder connected to an electric power substation.

5. The system of claim 1, wherein the reactive power setpoint value varies in a proportional relationship with a phase angle difference, the phase angle difference corresponding to a difference between the measured voltage phase angle of the electric power line connected to the load and the measured current phase angle of the electric power line connected to the load.

6. The system of claim 1, wherein the reactive power setpoint value varies in a proportional relationship with an integral gain of the controller, a derivative gain of the controller, or a proportional gain of the controller.

7. The system of claim 1, wherein the active power setpoint value varies in an inversely proportional relationship with a phase angle difference, the phase angle difference corresponding to a difference between the measured voltage phase angle of the electric power line connected to the load and the measured current phase angle of the electric power line connected to the load.

8. The system of claim 1, wherein the active power setpoint value varies in a proportional relationship with an integral gain of the controller, a derivative gain of the controller, or a proportional gain of the controller.

9. The system of claim 1, wherein the active power setpoint value is determined by the equation $\beta_P(K_p^P V_e + K_i^P \Sigma V_e T)$, wherein $\beta_P$ is a weighting coefficient for active power, $K_p^P$ is a proportional gain, $K_i^P$ is an integral gain, $V_e$ is a voltage error, and T is a time value.

10. The system of claim 1, wherein the reactive power setpoint value is determined by the equation $\beta_Q (K_p^Q V_e + K_i^Q \Sigma V_e T)$, wherein $\beta_Q$ is a weighting coefficient for reactive power, $K_p^Q$ is a proportional gain, $K_i^Q$ is an integral gain, $V_e$ is a voltage error, and T is a time value.

11. The system of claim 10, wherein the weighting coefficient for reactive power ($\beta_Q$) is determined by the following equations (a), (b), (c), and (d):

$$\varphi_i = \delta_{Vi} - \delta_{Ii}; \tag{a}$$

$$\gamma_i = 1.57((\text{floor}((\varphi_i/1.57)\%2+2)\%2)((\varphi_i\%1.57+1.57)\%1.57)(-1)^{(\text{floor}((\varphi_i/1.57)\% 2+2)\%2)+1}; \tag{b}$$

$$\bar{\gamma} = \Sigma^N_{i=1}\gamma i)/N; \tag{c}$$

$$\beta_Q = (\bar{\gamma}/1.57)^\alpha; \tag{d}$$

wherein $\varphi_i$ is phase angle difference between voltage and current of phase i,
wherein $\delta_{Vi}$ is measure voltage phase angle of phase i,
wherein $\delta_{Ii}$ is measured current phase angle of phase i,
wherein $\gamma_i$ is phase angle difference in a first quadrant of phase i,
wherein 1.57 corresponds to $\pi/2$,
wherein floor is a mathematical operator that returns the largest integer less than or equal to a specified number,
wherein % is a mathematical operator that computes a remainder after dividing a numerator by a denominator,
wherein $\bar{\gamma}$ is average phase angle difference in the first quadrant of phase i,
wherein N is total number of phases, and
wherein $\alpha$ is power cutoff point.

12. The system of claim 11, wherein the weighting coefficient for active power ($\beta_P$) is determined by the equation $\beta_P = 1 - \beta_Q$.

13. The system of claim 1, wherein the system is adapted to receive a user-settable parameter specifying how aggressively the system initially attempts to achieve a new voltage target by exploiting active power of the distributed energy resource.

14. The system of claim 1, wherein the system is adapted to receive a user-settable parameter specifying a multiplier that determines how aggressively the system attempts to react to error in voltage by exploiting active power of the distributed energy resource.

15. The system of claim 1, wherein the distributed energy resource is a battery.

16. A method for providing adaptive voltage control, comprising:
- measuring a voltage phase angle and a current phase angle of an electric power line connected to a load;
- measuring a voltage value output by a power converter, wherein the power converter (a) converts electric power supplied from a distributed energy resource and (b) supplies the converted power to the load;
- calculating an active power setpoint value and a reactive power setpoint value of the power converter based on the measured voltage value, the measured voltage phase angle of the electric power line connected to the load, and the measured current phase angle of the electric power line connected to the load; and
- setting an active power setpoint value and a reactive power setpoint value of the power converter.

17. The method of claim 16, wherein the power converter converts electric power from direct current (DC) power to alternating current (AC) power.

18. The method of claim 16, wherein measuring the voltage phase angle and the current phase angle includes receiving a time stamp from a Global Positioning System (GPS) and associating the received time stamp with the measured voltage phase angle and the measured current phase angle.

19. The method of claim 16, wherein the electric power line is a distribution feeder connected to an electric power substation.

20. The method of claim 16, wherein the reactive power setpoint value varies in a proportional relationship with a phase angle difference, the phase angle difference corresponding to a difference between the measured voltage phase angle of the electric power line connected to the load and the measured current phase angle of the electric power line connected to the load.

21. The method of claim 16, wherein the reactive power setpoint value varies in a proportional relationship with an integral gain of the controller, a derivative gain of the controller, or a proportional gain of the controller.

22. The method of claim 16, wherein the active power setpoint value varies in an inversely proportional relationship with a phase angle difference, the phase angle difference corresponding to a difference between the measured voltage phase angle of the electric power line connected to the load and the measured current phase angle of the electric power line connected to the load.

23. The method of claim 16, wherein the active power setpoint value varies in a proportional relationship with an integral gain of the controller, a derivative gain of the controller, or a proportional gain of the controller.

24. The method of claim 16, wherein the active power setpoint value is determined by the equation $\beta_P(K_p^P V_e + K_i^P \Sigma V_e T)$, wherein $\beta_P$ is a weighting coefficient for active power, $K_p^P$ is a proportional gain, $K_i^P$ is an integral gain, $V_e$ is a voltage error, and T is a time value.

25. The method of claim 16, wherein the reactive power setpoint value is determined by the equation $\beta_Q(K_p^Q V_e + K_i^Q \Sigma V_e T)$, wherein $\beta_Q$ is a weighting coefficient for reactive power, $K_p^Q$ is a proportional gain, $K_i^Q$ is an integral gain, $V_e$ is a voltage error, and T is a time value.

26. The method of claim 25 wherein the weighting coefficient for reactive power ($\beta_Q$) is determined by the following equations (a), (b), (c), and (d):

$$\varphi_i = \delta_{Vi} - \delta_{Ii}; \tag{a}$$

$$\gamma_i = 1.57((\text{floor}((\varphi_i/1.57)\%2+2)\%2)((\varphi_i\%1.57+1.57)\%1.57)(-1)^{(\text{floor}((\varphi_i/1.57)\%2+2)\%2)+1}; \tag{b}$$

$$\bar{\gamma} = \Sigma_{i=1}^{N} \gamma_i / N; \tag{c}$$

$$\beta_Q = (\bar{\gamma}/1.57)^\alpha; \tag{d}$$

wherein $\varphi_i$ is phase angle difference between voltage and current of phase i,
wherein $\delta_{Vi}$ is measure voltage phase angle of phase i,
wherein $\delta_{Ii}$ is measured current phase angle of phase i,
wherein $\gamma_i$ is phase angle difference in a first quadrant of phase i,
wherein 1.57 corresponds to $\pi/2$,
wherein floor is a mathematical operator that returns the largest integer less than or equal to a specified number,
wherein % is a mathematical operator that computes a remainder after dividing a numerator by a denominator,
wherein $\bar{\gamma}$ is average phase angle difference in the first quadrant of phase i,
wherein N is total number of phases, and
wherein $\alpha$ is power cutoff point.

27. The method of claim 26, wherein the weighting coefficient for active power ($\beta_P$) is determined by the equation $\beta_P = 1 - \beta_Q$.

28. The method of claim 16, wherein calculating an active power setpoint value and a reactive power setpoint value of the power converter is further based on a received parameter specifying how aggressively the method initially attempts to achieve a new voltage target by exploiting active power of the distributed energy resource.

29. The method of claim 16, wherein calculating an active power setpoint value and a reactive power setpoint value of the power converter is further based on a received parameter specifying a multiplier that determines how aggressively the method attempts to react to error in voltage by exploiting active power of the distributed energy resource.

30. The method of claim 16, wherein the distributed energy resource is a battery.

31. A voltage control system comprising:
- battery power supply means;
- phasor measurement means that measures a voltage phase angle and a current phase angle of an electric power line connected to a load;
- power conversion means for (a) converting electric power supplied from the battery supply means and (b) supplying the converted power to the load;
- voltage measurement means for measuring a voltage value output by the power conversion means;
- power setting means for setting an active power setpoint value and a reactive power setpoint value of the power conversion means; and
- control means for controlling the power setting means based on the voltage value measured by the voltage measurement means, the voltage phase angle and the current phase angle of the electric power line connected to the load.

32. The system of claim 31, wherein the conversion of the electric power is from direct current (DC) power to alternating current (AC) power.

33. The system of claim 31, wherein the phasor measurement means is adapted to receive a signal from a Global Positioning System (GPS) for associating a time stamp with the measured voltage phase angle and the measured current phase angle.

34. The system of claim 31, wherein the reactive power setpoint value varies in a proportional relationship with a phase angle difference, the phase angle difference corresponding to a difference between the measured voltage phase angle of the electric power line connected to the load and the measured current phase angle of the electric power line connected to the load.

35. The system of claim 31, wherein the reactive power setpoint value varies in a proportional relationship with an integral gain of the controller, a derivative gain of the controller, or a proportional gain of the controller.

36. The system of claim 31, wherein the active power setpoint value varies in an inversely proportional relationship with a phase angle difference, the phase angle difference corresponding to a difference between the measured voltage phase angle of the electric power line connected to the load and the measured current phase angle of the electric power line connected to the load.

37. The system of claim 31, wherein the active power setpoint value varies in a proportional relationship with an integral gain of the controller, a derivative gain of the controller, or a proportional gain of the controller.

38. The system of claim 31, wherein the active power setpoint value is determined by the equation $\beta_P(K_p^P V_e + K_i^P \Sigma V_e T)$, wherein $\beta_p^P$ is a weighting coefficient for active power, $K_p^P$ is proportional gain, $K_i^P$ is an integral gain, $V_e$ is a voltage error, and T is a time value.

39. The system of claim 31, wherein the reactive power setpoint value is determined by the equation $\beta_Q(K_i^Q V_e + K_i^Q \Sigma V_e T)$, wherein/$\beta_Q$ is a weighting coefficient for reactive power, $K_p^Q$ is a proportional gain, $K_i^Q$ an integral gain, $V_e$ is a voltage error, and T is a time value.

40. The system of claim 39, wherein the weighting coefficient for reactive power ($\beta_Q$) is determined by the following equations (a), (b), (c), and (d):

$$\varphi_i = \delta_{Vi} - \delta_{Ii}; \tag{a}$$

$$\gamma_i = 1.57((\text{floor}((\varphi_i/1.57)\%2+2)\%2)((\varphi_i\%1.57+1.57)\%1.57)(-1)^{(\text{floor}((\varphi i/1.57)\% 2+2)\%2)+1}; \tag{b}$$

$$\bar{\gamma} = )\Sigma^N_{i=1}\gamma i)/N; \tag{c}$$

$$\beta_Q = (\bar{\gamma}/1.57)^\alpha; \tag{d}$$

wherein $\varphi_i$ is phase angle difference between voltage and current of phase i,
wherein $\delta_{Vi}$ is measure voltage phase angle of phase i,
wherein $\delta_{Ii}$ is measured current phase angle of phase i,
wherein $\gamma_i$ is phase angle difference in a first quadrant of phase i,
wherein 1.57 corresponds to $\pi/2$,
wherein floor is a mathematical operator that returns the largest integer less than or equal to a specified number,
wherein % is a mathematical operator that computes a remainder after dividing a numerator by a denominator,
wherein $\bar{\gamma}$ is average phase angle difference in the first quadrant of phase i,
wherein N is total number of phases, and
wherein $\alpha$ is power cutoff point.

41. The system of claim 40, wherein the weighting coefficient for active power ($\beta_P$) is determined by the equation $\beta_P = 1 - \beta_Q$.

42. The system of claim 31, wherein the system is adapted to receive a user-settable parameter specifying how aggressively the system initially attempts to achieve a new voltage target by exploiting active power of the battery power supply means.

43. The system of claim 31, wherein the system is adapted to receive a user-settable parameter specifying a multiplier that determines how aggressively the system attempts to react to error in voltage by exploiting active power of the battery power supply means.

* * * * *